United States Patent
Lee et al.

(10) Patent No.: US 7,168,260 B2
(45) Date of Patent: Jan. 30, 2007

(54) REFRIGERATOR

(75) Inventors: Dong-Hoon Lee, Incheon (KR); Tae-Hee Lee, Seoul (KR); Yong-Gu Kim, Seoul (KR); Young-Hoon Yun, Daegu (KR)

(73) Assignee: LG Electronics Inc., Seoul (KR)

( * ) Notice: Subject to any disclaimer, the term of this patent is extended or adjusted under 35 U.S.C. 154(b) by 194 days.

(21) Appl. No.: 11/028,632

(22) Filed: Jan. 5, 2005

(65) Prior Publication Data

US 2005/0257556 A1 Nov. 24, 2005

(30) Foreign Application Priority Data

May 18, 2004 (KR) ...................... 10-2004-0035355

(51) Int. Cl.
*F25D 19/00* (2006.01)
(52) U.S. Cl. ......................................... 62/297; 248/678
(58) Field of Classification Search .......... 62/295–298; 248/677–678; 181/207, 209
See application file for complete search history.

(56) References Cited

U.S. PATENT DOCUMENTS

| | | | |
|---|---|---|---|
| 1,724,051 A | 8/1929 | Summers et al. | |
| 1,981,848 A | 11/1934 | Drysdale et al. | |
| 2,209,477 A * | 7/1940 | Reibel .......................... | 248/606 |
| 2,575,858 A * | 11/1951 | Bennett ........................ | 248/606 |
| 2,637,178 A | 5/1953 | Galazzi et al. | |
| 2,812,189 A | 11/1957 | Geldhof et al. | |
| 2,952,430 A * | 9/1960 | Garman ........................ | 248/606 |
| 3,059,882 A | 10/1962 | Staar et al. | |
| 3,208,700 A | 9/1965 | Bloomingdale | |
| 3,758,058 A | 9/1973 | Neudeck et al. | |
| 4,416,594 A * | 11/1983 | Ichikawa ..................... | 417/360 |
| 4,849,667 A * | 7/1989 | Morrill ........................ | 310/91 |
| 5,335,893 A * | 8/1994 | Opp ............................ | 248/635 |
| 5,810,322 A | 9/1998 | Zhao et al. | |
| 5,915,602 A * | 6/1999 | Nelson ........................ | 222/608 |
| 6,003,829 A * | 12/1999 | Martinsson ................. | 248/675 |
| 6,352,247 B1 * | 3/2002 | Ishikawa et al. ........ | 267/140.11 |
| 6,354,558 B1 * | 3/2002 | Li ............................... | 248/615 |
| 6,378,832 B1 * | 4/2002 | Li et al. ...................... | 248/637 |
| 6,543,741 B1 * | 4/2003 | Li et al. ...................... | 248/638 |

FOREIGN PATENT DOCUMENTS

| | | |
|---|---|---|
| FR | 891 160 A | 2/1944 |
| FR | 2803502 A1 * | 2/2002 |
| GB | 758 884 A | 10/1956 |
| GB | 1 478 998 A | 7/1977 |
| JP | 61-210851 A | 9/1986 |

* cited by examiner

*Primary Examiner*—Mohammad M. Ali
(74) *Attorney, Agent, or Firm*—Birch, Stewart, Kolasch, and Birch, LLP

(57) ABSTRACT

Disclosed is a refrigerator, comprising: a refrigerator main body having a cooling chamber storing foods and a machine room; a base plate installed a lower portion of the main body and mounting a compressor; a lifting unit installed between the base plate and the main body, for supporting the base plate to be moved in an up and down direction; and a locking unit installed at one side of the lifting unit, for locking the lifting unit to restrict an upward/downward movement of the base plate when carrying the refrigerator, by which vibration generated from a compressor can be prevented from being transferred to a refrigerator main body through the base plate, and the compressor mounted on the base plate and pipes can be protected from being damaged by locking the base plate when carrying the refrigerator.

17 Claims, 13 Drawing Sheets

REFRIGERATOR

BACKGROUND OF THE INVENTION

1. Field of the Invention

The present invention relates to a refrigerator, and particularly, to a refrigerator capable of reducing vibration generated from a compressor to be transferred to a refrigerator main body through a base frame in which the compressor is mounted.

2. Description of the Background Art

FIG. 1 is a perspective view showing a machine room of a refrigerator in accordance with the conventional art, and FIG. 2 is a front view showing the machine room of the refrigerator according to the conventional art.

The conventional refrigerator is comprised of: a main body 102 having a cooling chamber such as a freezing chamber and a refrigerating chamber therein; and a machine room 106 positioned at a lower portion of a rear side of the main body 102 and having various components forming a refrigeration cycle such as a compressor compressing a refrigerant.

A door 108 is positioned at a front side of the main body 102 to open/close the cooling chamber and a foot 110 for supporting the main body 102 to be adjustable for its height is installed at the lower portion of the main body 102.

The machine room 106 is screw-engaged with a cover 112 for opening/closing the machine room at a front side of thereof, and a control box 116 for controlling the refrigeration cycle is installed at one inner side of the machine room 106. Also, a water tray 118 for storing water generated from the refrigeration cycle by a defrosting operation is installed at an inner upper side. A base plate 120 is mounted on a lower surface of the machine room 106 and the compressor 104 is mounted on the base plate 120. The base plate 120 is engaged with the lower surface of the main body 102 by a bolt 140.

The compressor 104 is installed at the base plate by a mounting bracket 122, and the mounting bracket 122 has a vibration preventing rubber 124 therein for preventing vibration generated from the compressor 104 from being transferred to the main body 102. Moreover, the compressor 104 is connected to an evaporator (not shown) installed at a rear side of the main body 102 by a suction pipe 130 to suck a refrigerant from the evaporator. The compressor 104 is also connected to a condenser (not shown) installed at the rear side of the main body 102 by a discharge pipe 132 to discharge the compressed refrigerant to the condenser.

However, in the conventional refrigerator which has constructed as aforementioned, since the base plate (on which the compressor is mounted) is engaged with the main body by the bolt, vibration generated from the compressor may be transferred to the main body through the base plate.

In particular, in case that noise is operated as an important factor like in a wine refrigerator, the vibration transferred to a cooling chamber can have a bad influence on wine ripening.

SUMMARY OF THE INVENTION

Therefore, in order to solve those problems, an object of the present invention is to provide a refrigerator in which vibration generated from a compressor is prevented from being transferred to a refrigerator main body through a base plate by separating the base plate having the compressor therein from the main body and insulating the vibration thereby.

Another object of the present invention is to provide a refrigerator capable of protecting a compressor mounted on a base plate and pipes from being damaged by locking the base plate when moving the refrigerator.

To achieve these and other advantages and in accordance with the purpose of the present invention, as embodied and broadly described herein, there is provided a refrigerator, including: a refrigerator main body having a cooling chamber storing foods and a machine room; a base plate installed in a lower portion of the main body and mounting a compressor; a lifting unit installed between the base plate and the main body, for supporting the base plate to be moved in an up and down direction; and a locking unit installed at one side of the lifting unit, for locking the lifting unit to restrict an upward/downward movement of the base plate when carrying the refrigerator.

The lifting unit is comprised of: a guide rod fixed to a supporting portion formed at a lower portion of the main body in a perpendicular direction; and a lifting portion formed at both edges of the base plate and inserted to the guide rod to be moved in an up and down direction.

The lifting portion is formed by curving both edges of the base plate in an upward direction and has a guide hole inserted into the guide rod therein.

The locking unit is comprised of: an operating lever rotatably hinge-connected to an upper surface of the supporting portion, for pushing up the lifting portion by an operation of a user; and a spring installed between the operating lever and the supporting portion, for maintaining the lifting portion to be lifted by providing an elastic force to the operating lever.

The operating lever is comprised of: an adjusting portion is exposed outside of the main body, for allowing a user to adjust it; a hinge portion formed at the supporting portion by being curved at the adjusting portion and hinge-connected to a hinge bracket; and an operating portion formed at the end of the hinge portion, for pushing up the base plate when the adjusting portion is operated.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

An embodiment of vibration-reducing refrigerator in accordance with the present invention will be described with reference to the accompanying drawings as follows.

There may be various embodiments for the vibration-reducing refrigerator according to the present invention, and it will be explained of the preferred embodiments hereinafter.

Figure 1:
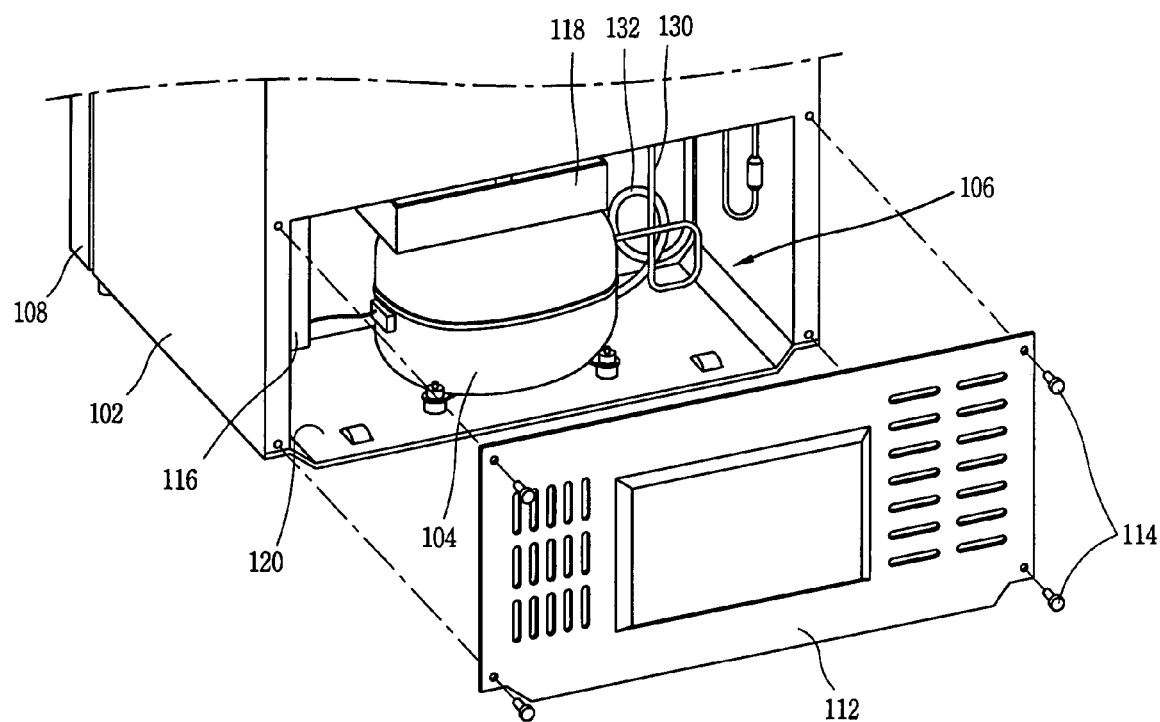
FIG. 1 is a perspective view showing a machine room of a refrigerator based on the conventional art.
Figure 2:
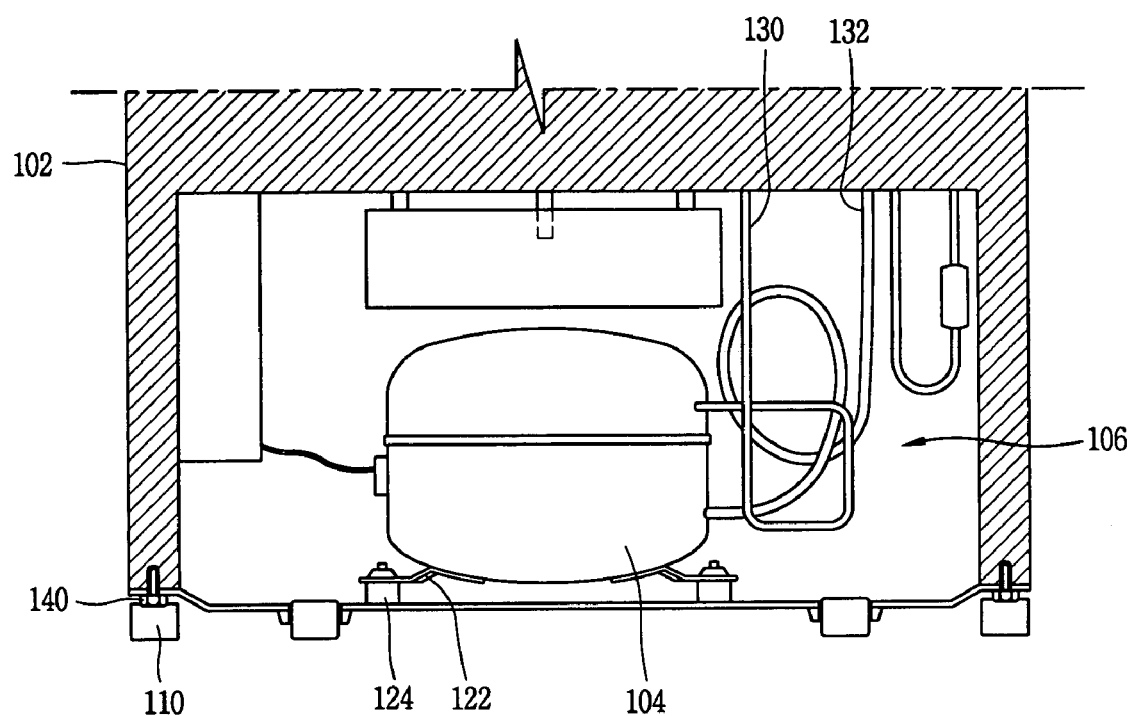
FIG. 2 is a sectional view showing the machine room of the refrigerator based on the conventional art.
Figure 3:
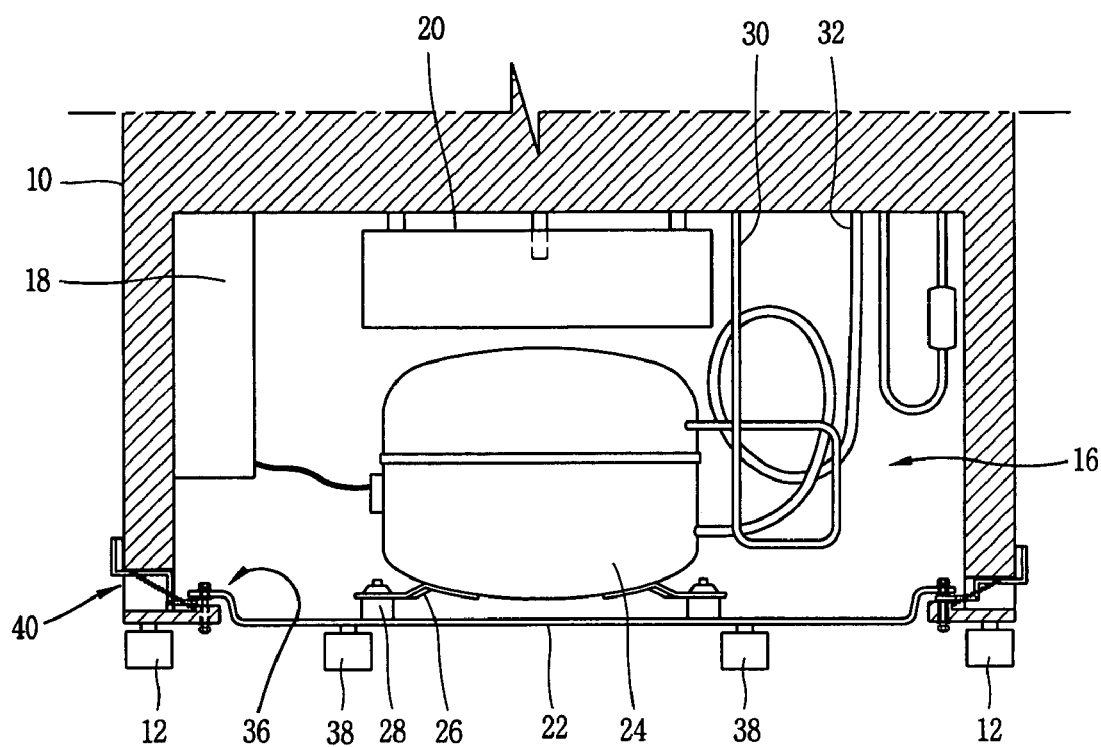
FIG. 3 is a sectional view showing a machine room of a refrigerator in accordance with an embodiment of the present invention.
Figure 4:
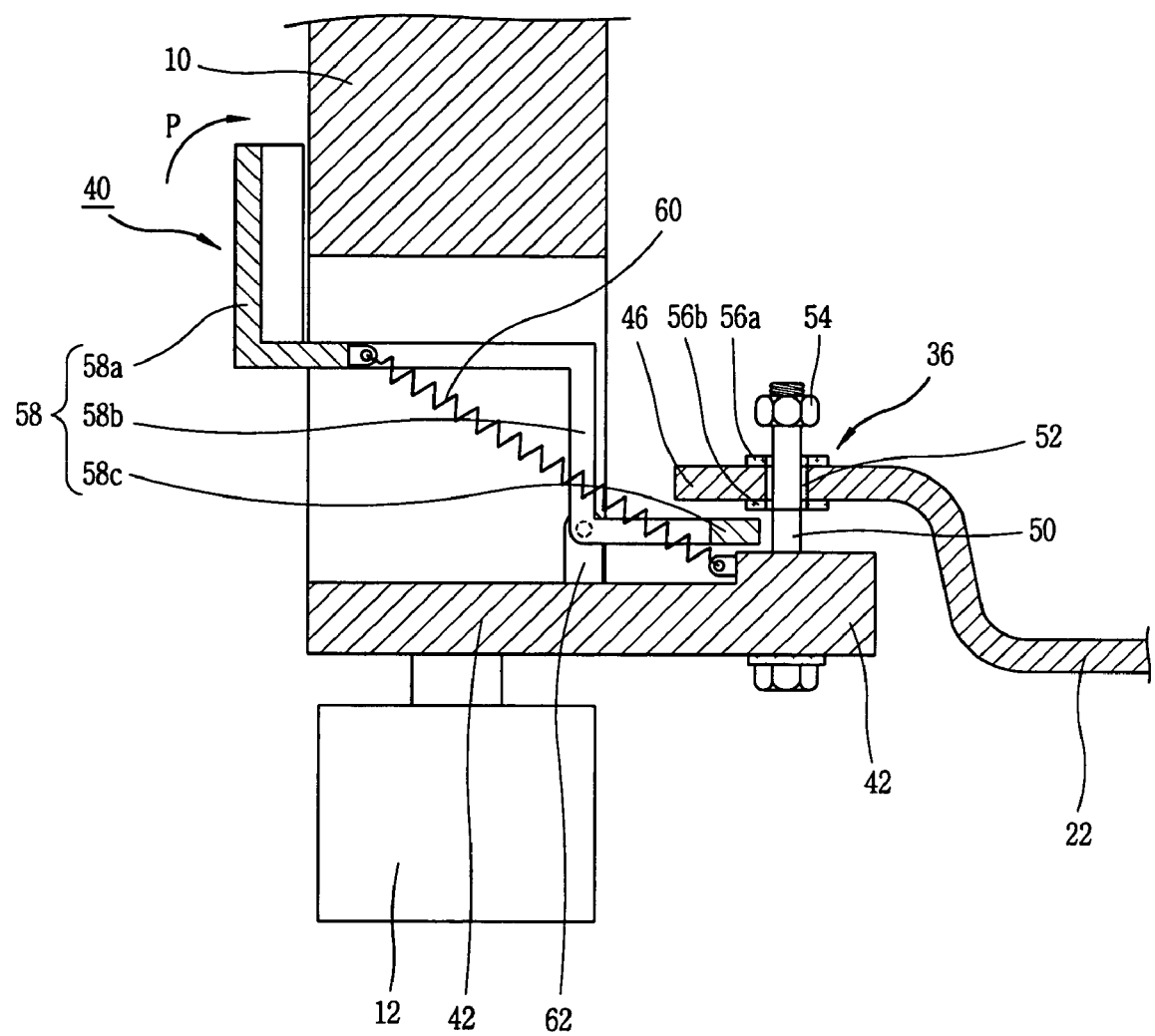
FIG. 4 is a sectional view showing a lifting unit and a locking unit in accordance with an embodiment of the present invention.
Figure 5:
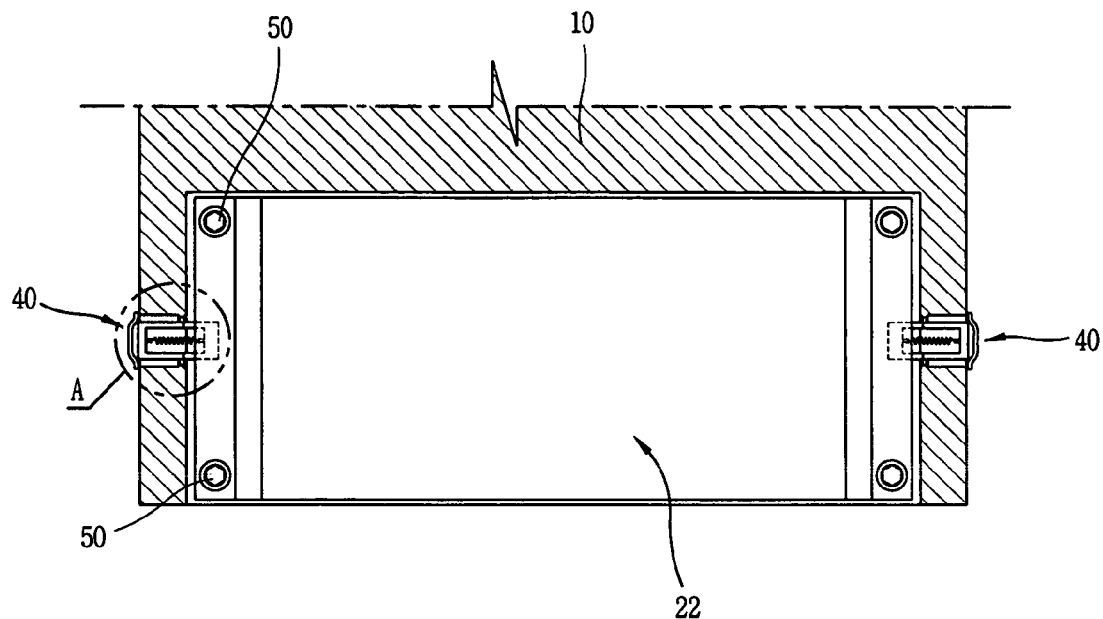
FIG. 5 is a bottom view of the machine room of the refrigerator in accordance with an embodiment of the present invention.
Figure 6:
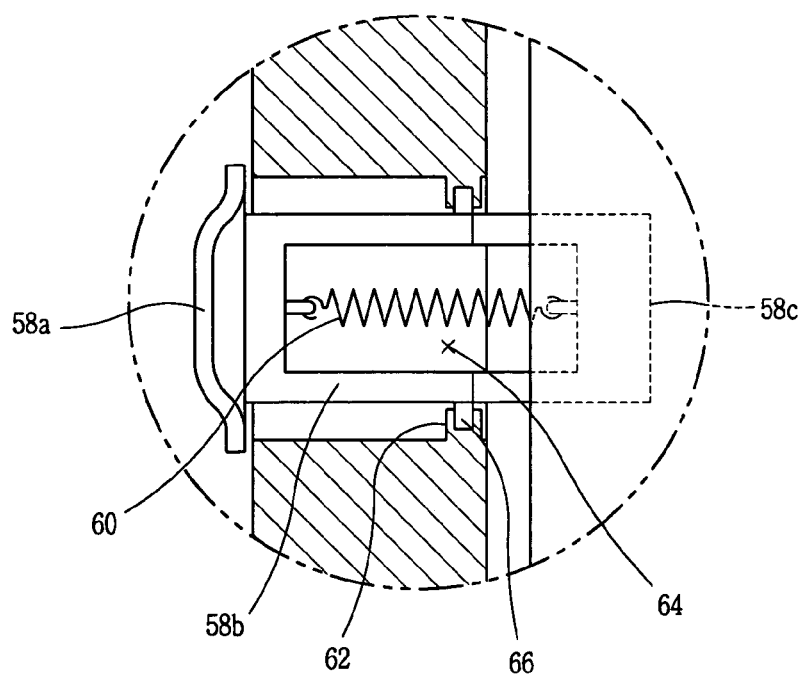
FIG. 6 is a detailed view showing a part A in FIG. 5.

FIG. 3 is a sectional view showing a machine room of a refrigerator in accordance with an embodiment of the present invention, FIG. 4 is a sectional view showing a lifting unit and a locking unit in accordance with an embodiment of the present invention, FIG. 5 is a bottom view showing the machine room of the refrigerator in accordance with an embodiment of the present invention, and FIG. 6 is a detailed view showing a part A in FIG. 5.

The refrigerator according to an embodiment of the present invention is comprised of: a refrigerator main body 10 having a cooling chamber such as a freezing chamber and a refrigerating chamber therein and a foot 12 mounted on the lower portion thereof, for supporting the refrigerator; and a machine room 16 installed the lower portion of the main body 10, for installing various components of a refrigeration cycle.

A control box 18 for controlling the refrigeration cycle is installed inside of the machine room 16, and a water tray 20 for storing water generated from the refrigeration cycle by a defrosting operation is installed at an inner upper side of the machine room 16. Furthermore, a base plate 22 is installed the lower surface of the machine room 16, and a compressor 24 for compressing a refrigerant is mounted on an upper surface of the base plate 22.

The compressor 24 is mounted on the base plate by a mounting bracket 26, and a vibration preventing rubber 28 is installed at the mounting bracket 26, thereby preventing vibration generated from the compressor 24 from being transferred to the main body 10.

Moreover, the compressor 24 is connected to an evaporator by a suction pipe 30 to suck the refrigerant, and connected to a condenser by a discharge pipe 32 to discharge the compressed refrigerant.

The base plate 22 is positioned at an upper surface of a supporting portion 42 (of which both edges are extended toward an inside direction from a lower surface of the main body) by having a constant interval therebetween. A supporting leg 38 is mounted on the lower surface of the base plate 22 thereby to be in contact with a bottom surface.

Accordingly, the base plate 22 is separated from the main body 10 so as to prevent vibration generated from the compressor 24 from being transferred to the main body 10 through the base plate 22.

A lifting unit 36 for allowing an upward/downward movement of the base plate 22 at the main body 10 is installed between the base plate 22 and the main body 10, and a locking unit 40 for locking the base plate not to be moved is installed at one side of the lifting unit 36, by which the suction pipe 30 and the discharge pipe 32 connected to the compressor can be protected from being damaged due to the upward/downward movement of the base plate when carrying the refrigerator.

The lifting unit 36 is comprised of: a guide rod mounted in a vertical direction on the supporting portion 42 formed at the lower surface of the main body 10; and a lifting portion 46 formed by curving both edges of the base plate 22 in an upward direction and positioned at an upper surface of the supporting portion 42 at a constant interval, and having a guide hole 52 inserted into the guide rod 50 to be moved up and down.

Here, the guide rod 50 is fixed to the supporting portion 42 of the main body 10 to be perpendicularly stood (on the supporting portion 42). A separation preventing nut 54 for preventing the lifting portion 46 of the base plate 22 inserted into the guide rod 50 from being separated is engaged with an upper end of the guide rod 50.

Vibration preventing members 56a and 56b are mounted on the upper and lower surfaces of the lifting portion 46 having the guide hole 52 therein, thereby preventing impact which may be generated when the lifting portion 46 is moved in an up and down direction and is bumped against the upper surface of the separation preventing nut 54 or the supporting portion 42.

Figure 7:
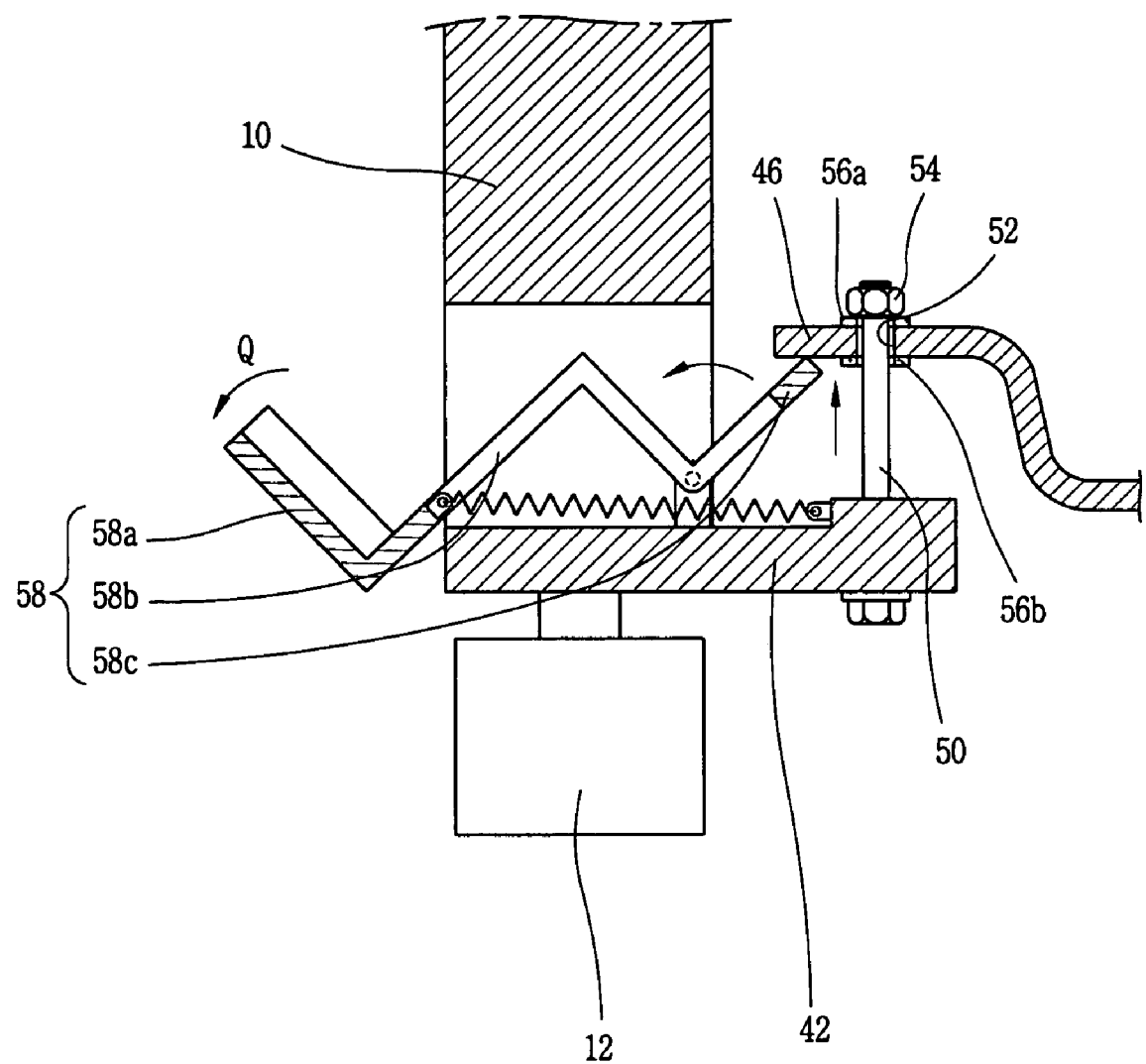
FIG. 7 is a state diagram showing an operation of the lifting unit and the locking unit in accordance with an embodiment of the present invention.

FIG. 7 is a state diagram showing an operation of the lifting unit and the locking unit of the refrigerator according to the present invention.

When the refrigerator is installed at the bottom surface, the supporting leg 38 mounted on the lower surface of the base plate 22 is in contact with the bottom surface and thereby the lifting unit 36 can support the base plate 22. At this time, the lifting portion 46 is positioned in the middle of the guide rod 50 to be easily moved in an up and down direction within a certain range.

Therefore, when vibration is generated from the compressor 24 mounted on the base plate 22, because the lifting portion 46 of the base plate 22 is moved up and down at the guide rod 50, the vibration generated from the compressor 24 can be prevented from being transferred to the main body 10 through the base plate 22.

The locking unit 40 locks the base plate not to be moved in order to prevent various types of components mounted on the base plate 22 from being damaged due to an upward/downward movement of the base plate 22 when carrying the refrigerator. The locking unit 40 is comprised of: an operating lever 58 rotatably hinge-connected to the upper surface of the supporting portion 42, for pushing up the lifting portion 46 by an adjustment of a user; and a spring 60 installed between the operating lever 58 and the supporting portion 42, for maintaining the lifting portion 46 to be lifted by providing an elastic force to the operating lever 58.

The operating lever 58 is comprised of: an adjusting portion 58a set to be exposed outside of the main body 10, for allowing a user to adjust it; a hinge portion 58b hinge-connected to a hinge bracket 62 which is formed at the supporting portion 42 by being curved at the adjusting portion 58a; and an operating portion 58c formed at the end of the hinge portion 58b, for pushing up the base plate 22 when the user adjusts the adjusting portion 58a.

Here, the hinge portion 58b is divided into two parts to form a space portion 64 therein, and the spring 60 is set in the space portion 64. Also, a hinge pin is protruded from both side surfaces of the hinge portion 58b to be rotatably supported at the hinge bracket 62.

One side of the spring 60 is connected to the hinge portion 58b and the other side thereof is connected to the supporting portion 42 of the main body 10. According to this, when the operating lever 58 is in an initial state, the initial state of the operating lever 58 can be maintained by providing an elastic force in order to rotate the operating lever 58 in a direction of an arrow P. Also, when the operating portion 58c of the operating lever 58 is in a state that the base plate is pushed up, an elastic force is provided to rotate the operating lever 58 in a direction of an arrow Q thereby to maintain the operating lever 58 to be in the rotated state.

Accordingly, if a user pulls down the adjusting portion of the operating lever when carrying a refrigerator, the operating lever deals successfully with an elastic force of a spring and is rotated centering around a hinge portion. Thereafter, the operating portion pushes up the lifting portion of the base plate to adhere it closely to the separation preventing nut. The base plate is thereby locked not to be moved up and down so as to prevent damages on a compressor mounted on the base plate and a suction pipe and a discharge pipe which are connected to the compressor.

Figure 8:
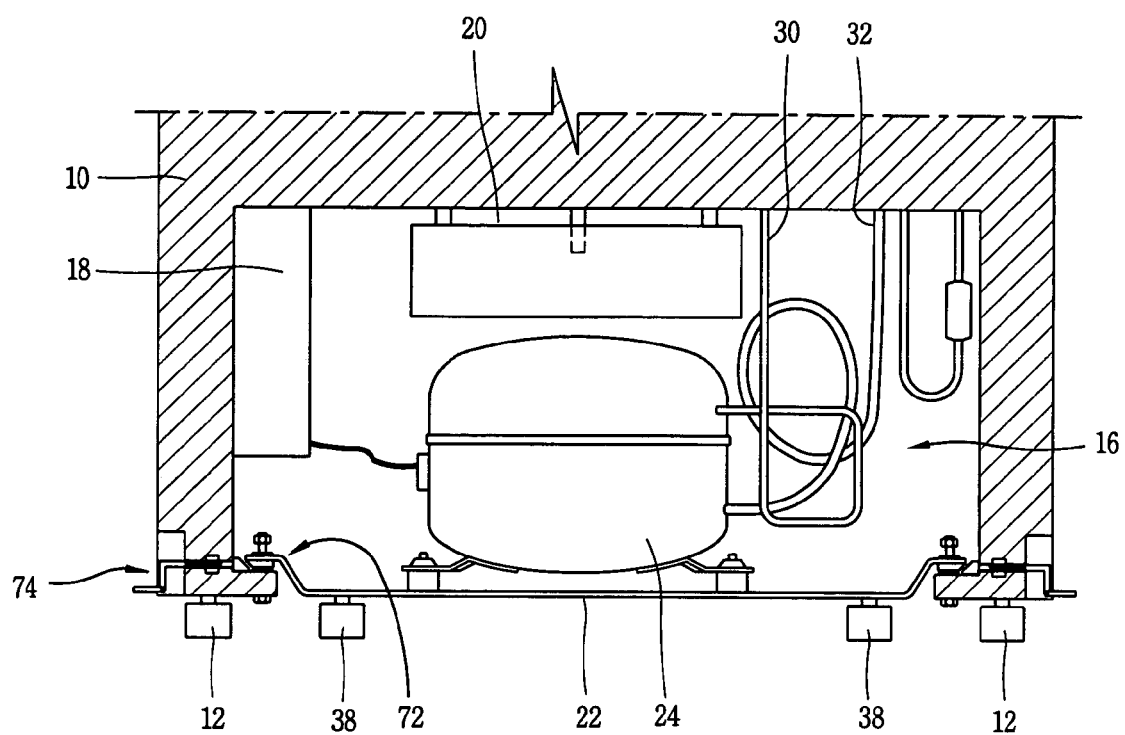
FIG. 8 is a sectional view showing a machine room of a refrigerator in accordance with a second embodiment of the present invention.
Figure 9:
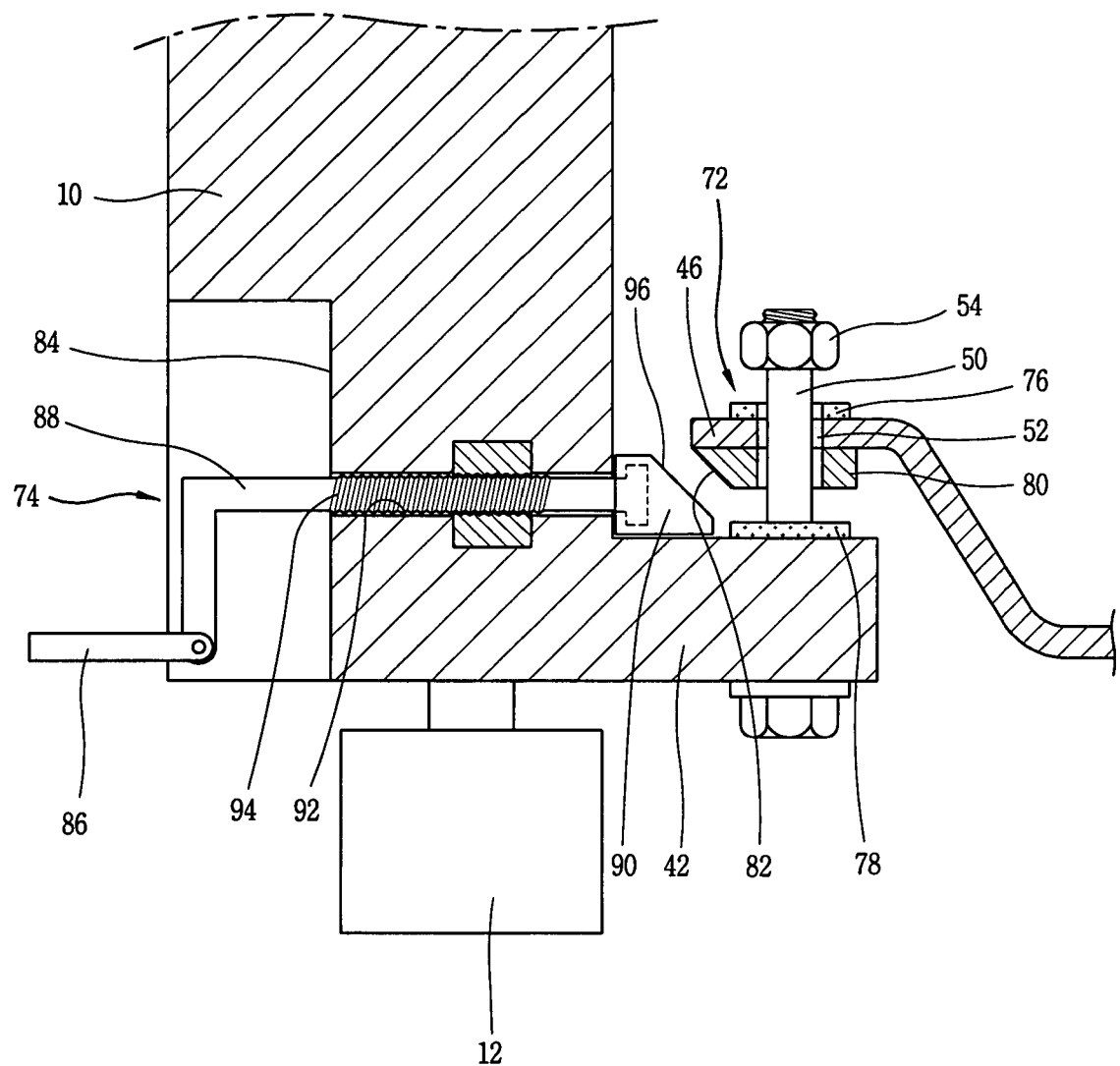
FIG. 9 is a sectional view showing a lifting unit and a locking unit in accordance with the second embodiment of the present invention.
Figure 10:
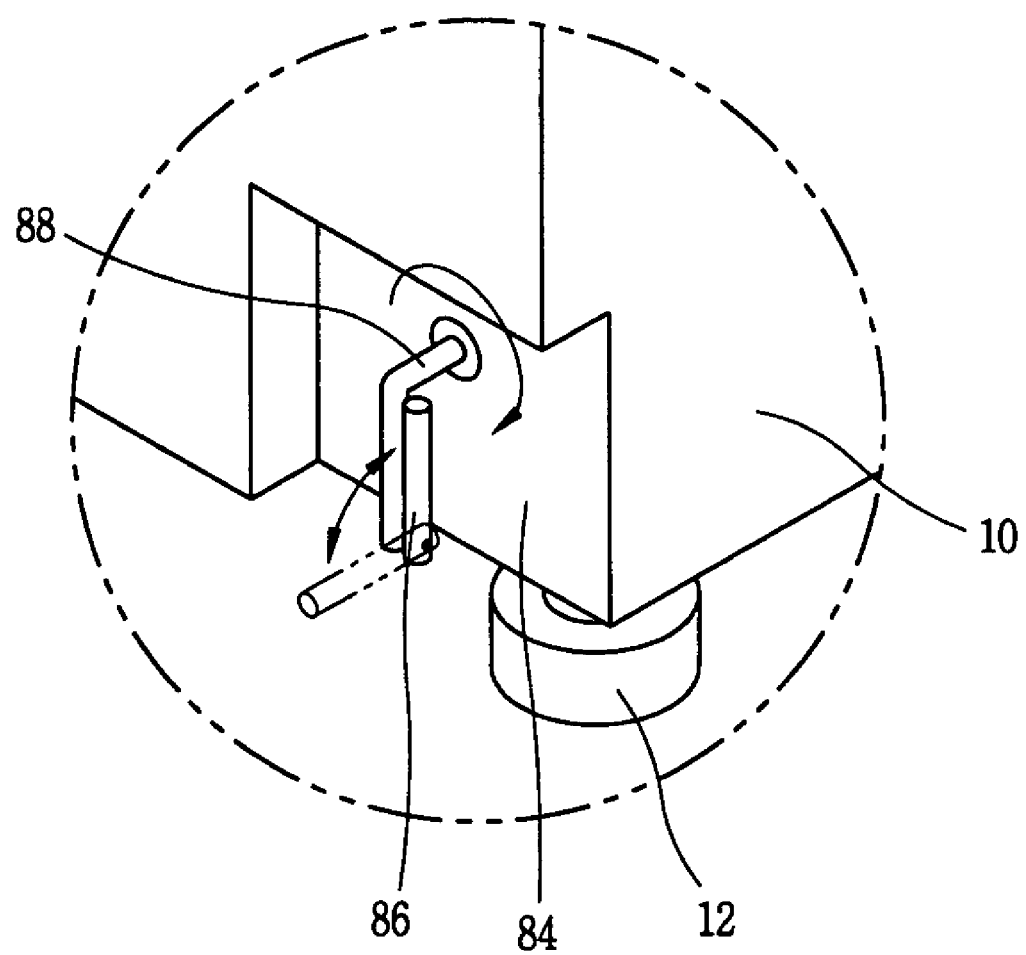
FIG. 10 is a partial perspective view showing a lever of the locking unit in accordance with the second embodiment of the present invention.

FIG. 8 is a sectional view showing a machine room of a refrigerator in accordance with a second embodiment of the present invention, FIG. 9 is a sectional view showing a lifting unit and a locking unit in accordance with the second embodiment of the present invention, and FIG. 10 is a perspective view showing a handle of the locking unit in accordance with the second embodiment of the present invention.

The lifting unit 72 in accordance with the second embodiment of the present invention is comprised of: a guide rod 50 mounted in a vertical direction on a supporting portion 72 formed at a lower surface of the main body 10; and a lifting portion 46 formed by curving both edges of the base plate 22 in an upward direction and positioned at an upper surface of the supporting portion 42 at a constant interval, and having a guide hole 52 inserted into the guide rod 50 to be moved up and down.

Here, a first vibration preventing member 76 for reducing impact, which may be generated in a case of bumping against the separation preventing nut 54 mounted on the end part of the guide rod 50, is mounted on an upper surface of the lifting portion 46. Furthermore, a guide member 80 having an inclination surface 82 thereon is mounted on a lower surface of the lifting portion 46, for lifting up the lifting portion 46 by guiding the operating member 90 when the operating member 90 of the locking unit 74 is moved forward.

Moreover, a second vibration preventing member 78 for performing an impact-absorbing operation in case of a contact with the lifting portion 46 is mounted on an upper surface of the supporting portion 42.

The lifting unit 72 according to the second embodiment can prevent vibration generated from the compressor from being transferred to the main body 10 through the base plate 22 because the lifting portion 46 of the base plate 22 is moved up and down at the guide rod 50 when the vibration is generated from the compressor 24 mounted on the base plate 22.

The locking unit 74 includes: a handle 86 set in a reception groove 84 formed at a lower side of the main body 10, for enabling a user to grab and rotate it with a hand; a rod 88 connected to the handle 86 and screw-engaged with a spiral hole 92 formed in a horizontal direction with the main body 10 and thereby linearly moved when turning the handle 86; and an operating member 90 mounted on an end part of the rod 88, for lifting up the lifting portion 46 by pushing the guide member 80 when the rod 88 is moved forward.

The handle 82, as shown in FIG. 10, is hinge-connected to the rod 88 and is unfolded to the outside for use, and is folded after using it to be placed in the reception groove.

The rod 88 has a male screw portion 94 at an outer circumferential surface thereof. The male screw portion 94 is screw-coupled to the spiral hole 92 formed at the main body 10. When the rod 88 is rotated, the male screw portion 94 is thereby linearly moved.

The operating member 90 has an inclination surface 96, same as that of a guide member 80, at one side surface thereof. When the operating member 90 is moved forward, the guide member 80 is lifted along the inclination surface 96 of the operating member 90.

Figure 11:
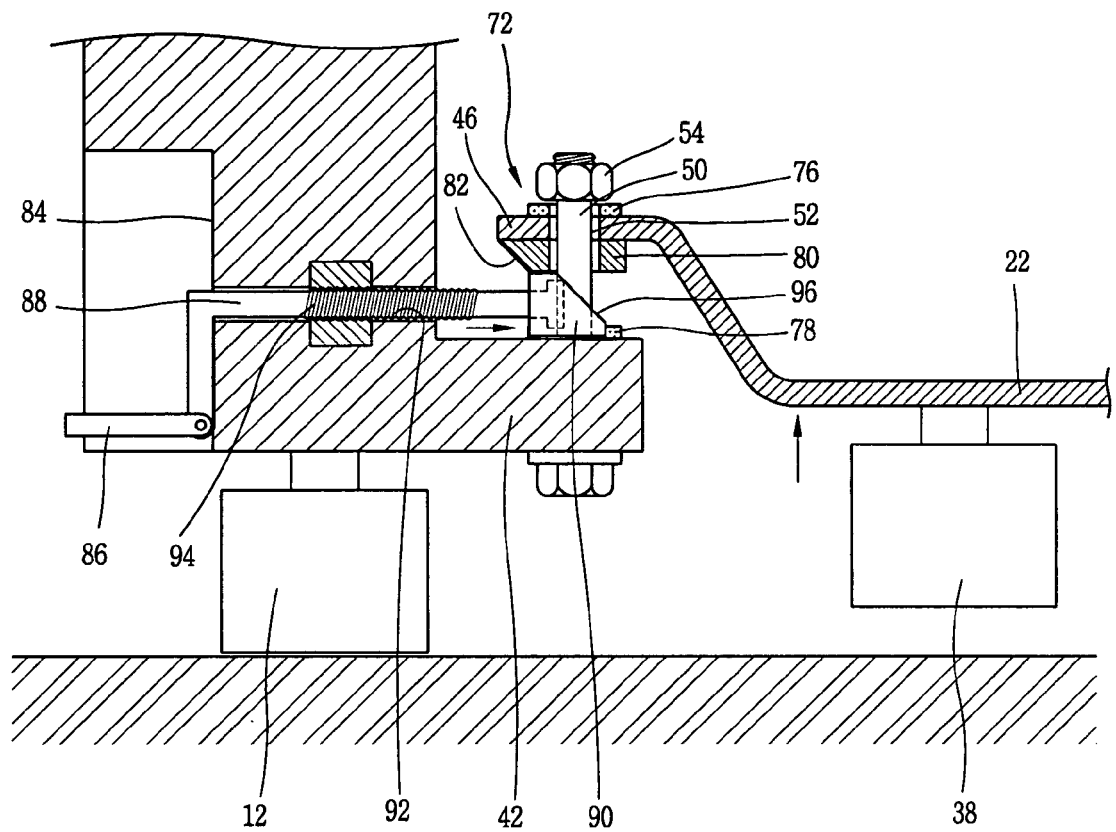
FIG. 11 is a state diagram showing an operation of the lifting unit and the locking unit in accordance with the second embodiment of the present invention.

FIG. 11 is a state diagram showing an operation of the locking unit in accordance with the second embodiment of the present invention.

According to the second embodiment, when carrying a refrigerator, if a user grabs and turns the handle 86, the rod 88 is also rotated. As a result of this, the locking unit 74 is linearly moved. The operating member 90 mounted on the end part of the rod 88 is thereby moved forward by the linear movement of the rod 88, which results in pushing up the guide member 80 mounted on the lifting portion 46. When the lifting portion 46 is lifted, the first vibration preventing member 76 mounted on the upper surface of the lifting portion 46 is thereby adhered closely to the separation preventing nut 54, by which the lifting portion 46 is restricted to be moved up and down. Therefore, the base plate 22 is locked not to be moved up and down.

Figure 12:
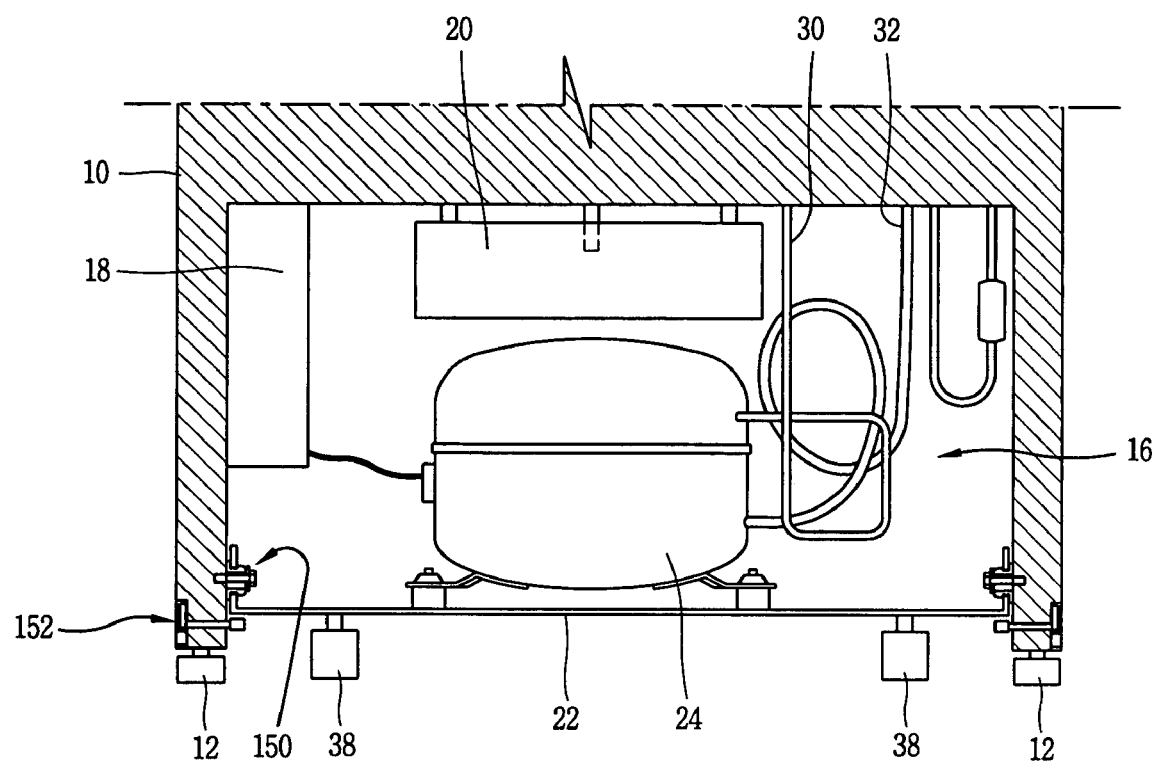
FIG. 12 is a sectional view showing a machine room of a refrigerator in accordance with a third embodiment of the present invention.
Figure 13:
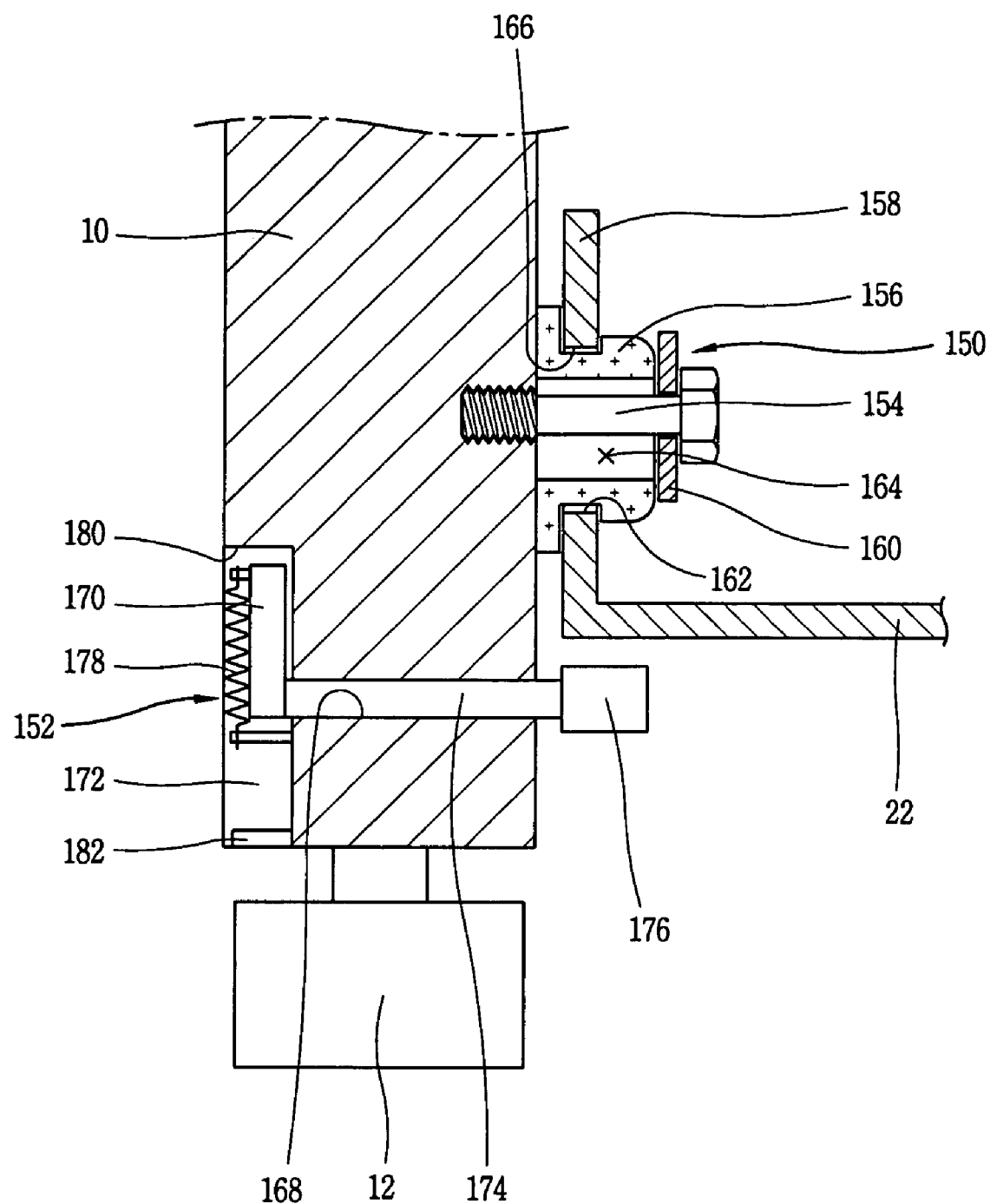
FIG. 13 is a sectional view of a lifting unit and a locking unit in accordance with the third embodiment of the present invention.
Figure 14:
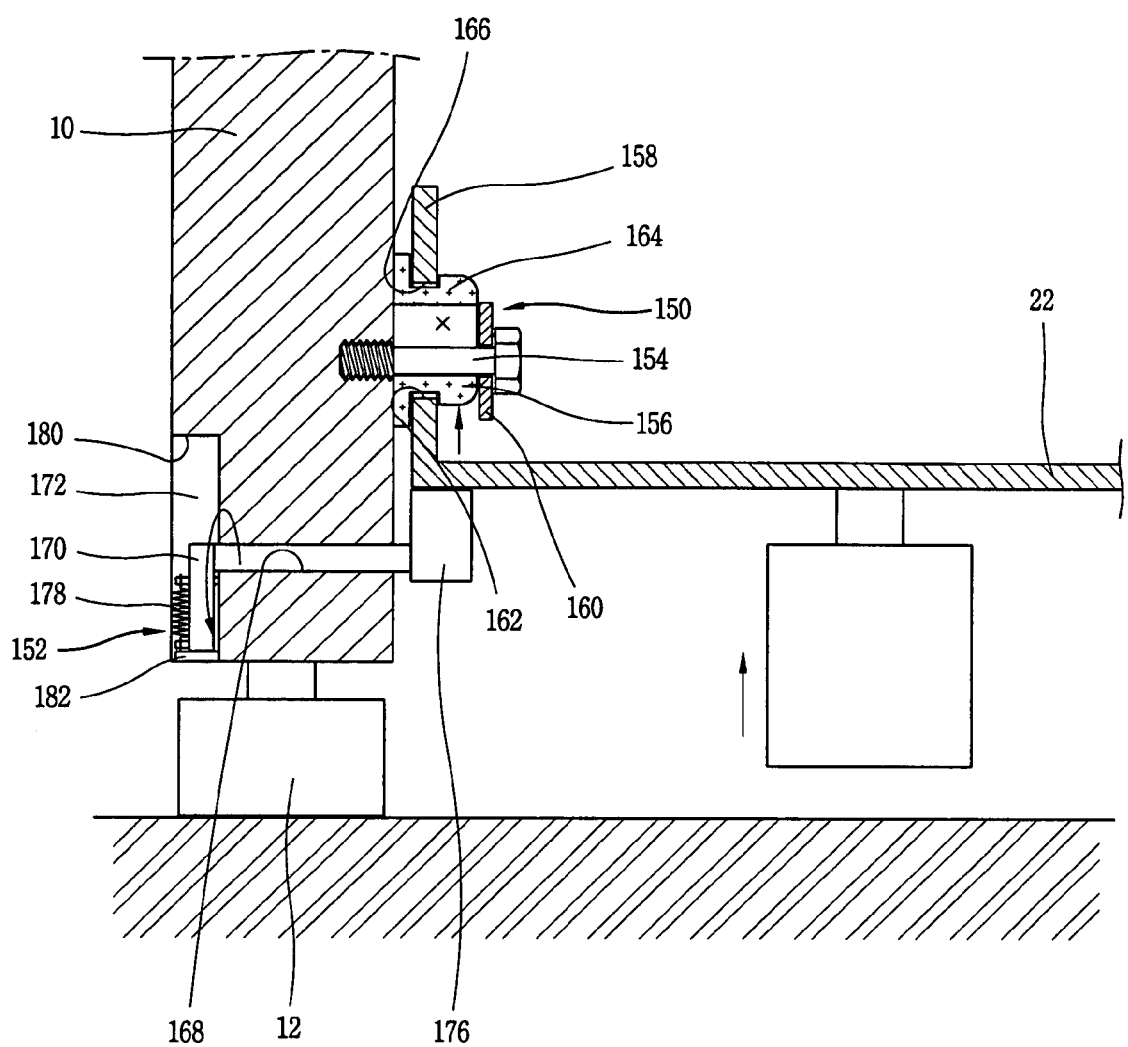
FIG. 14 is a state diagram showing an operation of the lifting unit and the locking unit in accordance with the third embodiment of the present invention.

FIG. 12 is a sectional view showing a machine room of a refrigerator in accordance with a third embodiment of the present invention, FIG. 13 is a sectional view showing a lifting unit and a locking unit in accordance with the third embodiment of the present invention, and FIG. 14 is a state diagram showing an operation of the lifting unit and the locking unit in accordance with the third embodiment of the present invention.

The lifting unit 150 according to the third embodiment includes: a supporting rod 154 fixed to an inner wall of a lower side of the main body 10; a vibration preventing member 156 inserted into an outer circumferential surface of the supporting rod 154 to be lifted; and a lifting portion 158 fixed to an outer circumferential surface of the vibration preventing member 156 and curved up at both edges of the base plate 22.

Here, a lower end of the supporting rod 154 is screw-engaged with an inner wall of a lower side of the main body 10 and horizontally placed thereat, and a washer for preventing the vibration preventing member 156 from being separated is mounted on an upper end of the supporting rod 154.

The vibration preventing member 156 has a space portion inserted into the supporting rod 154 therein. The space portion 154 is formed to have a greater inside diameter than an outside diameter of the supporting rod 154 so as to be inserted into the supporting rod 154 to allow the vibration preventing member 156 to be moved up and down. A groove 162 is formed at an outer circumferential surface of the space portion 154 in a circumferential direction so as to be inserted and coupled to a fixing hole 166 formed at the lifting portion 158.

According to the third embodiment, when vibration is generated from the compressor, the base plate 22 is vibrated in an up and down direction, and the vibration preventing member 156 (on which the lifting portion 158 placed at both edges of the base plate is mounted) is moved in an up and down direction with being inserted into the supporting rod 154 fixed to the main body 10. As a result of this, the lifting unit 150 can prevent the vibration of the compressor from being transferred to the main body 10 through the base plate 22.

Furthermore, the locking unit 152 according to the third embodiment includes: a handle 170 set in a reception groove 172 formed at a lower side of the main body 10, for allowing a user to grab and turn it; a rod 174 rectangularly connected to the handle 170 and rotatably inserted into a through hole 168 formed in a horizontal direction with the main body 10; and a cam 176 eccentrically formed at an end part of the rod 174 and positioned at a lower surface of the base plate 22, for pushing up the base plate 22 when the rod 174 is rotated.

Moreover, a spring 178 for maintaining a position where the handle 170 is turned is connected between the handle 170 and one side of a reception groove 172. When the handle 170 is placed at an upper side or at a lower side by being turned by 180°, the spring 178 provides an elastic force to the handle 170 to maintain the position of the handle 170.

Additionally, a first stopper 180 and a second stopper 182 for preventing the handle 170 from being turned more than 180° are formed at an upper end and a lower end of the reception groove 172.

As stated above, once the handle 170 is turned by 180° in a downward direction when carrying a refrigerator, the rod 174 connected to the handle 170 is rotated, and thereby the cam 176 connected to the rod 174 is also rotated, by which a part taking up a large portion of the cam 176 pushes up the base plate 22.

Then, the vibration preventing member 156 mounted on the lifting portion 158 of the base plate 22 is lifted and an inner circumferential surface of the vibration preventing member 156 is thereby in contact with the supporting rod 154. As a result of this, the base plate 22 is restricted to be moved up and down.

In the refrigerator constructed and operated as aforementioned according to the present invention, the vibration generated from the compressor can be prevented from being transferred to the main body through the base plate by installing the lifting unit for separating the base plate having the compressor therein from the main body and for supporting the base plate to be moved up and down.

Furthermore, by installing the locking unit at one side of the lifting unit, it is advantageous to protect the compressor mounted in the base plate and pipes from being damaged by locking the base plate when carrying refrigerator.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A refrigerator, comprising:
    a refrigerator main body having a cooling chamber storing foods and a machine room;
    a base plate installed a lower portion of the main body and mounting a compressor;
    a lifting unit installed between the base plate and the main body, for supporting the base plate to be moved in an up and down direction; and
    a locking unit installed at one side of the lifting unit, for locking the lifting unit to restrict an upward/downward movement of the base plate when carrying the refrigerator.

2. The refrigerator of claim 1, wherein the lifting unit comprises:
    a guide rod fixed to a supporting portion formed at a lower portion of the main body in a vertical direction; and
    a lifting portion formed at both edges of the base plate and inserted to the guide rod to be movable in an up and down direction.

3. The refrigerator of claim 2, wherein a separation preventing nut is coupled at an upper end of the guide rod, for preventing the lifting portion of the base plate from being separated.

4. The refrigerator of claim 2, wherein the lifting portion is formed by curving both edges of the base plate in an upward direction and has a guide hole inserted into the guide rod therein.

5. The refrigerator of claim 2, wherein a vibration preventing member is mounted on at least one surface of an upper surface and a lower surface of the lifting portion.

6. The refrigerator of claim 2, wherein the locking unit comprises:
    an operating lever rotatably connected to an upper surface of the supporting portion, for pushing up the lifting portion by a user; and
    a spring installed between the operating lever and the supporting portion, for maintaining the lifting portion to be lifted by providing an elastic force to the operating lever.

7. The refrigerator of claim 6, wherein the operating lever comprises:
    an adjusting portion is exposed outside of the main body;
    a hinge portion connected at the adjusting portion and rotatably connected to a hinge bracket formed at the supporting portion; and
    an operating portion formed at the end of the hinge portion, for pushing up the base plate when the adjusting portion is operated.

8. The refrigerator of claim 6, wherein the spring is formed as a coil spring of which one end is connected to one side of the operating lever and the other end thereof is connected to the supporting portion of the main body.

9. The refrigerator of claim 2, wherein the locking unit comprises:
    a handle installed a lower side of the main body;
    a rod connected to the handle and screw-engaged with a spiral hole formed at the main body and linearly moved when turning the handle; and an operating member mounted on an end part of the rod and installed between the lifting portion and the supporting portion, for lifting up the lifting portion when the rod is moved forward.

10. The refrigerator of claim 9, wherein the handle inserted inside a reception groove formed at a lower side of the main body and rotatably connected to the rod.

11. The refrigerator of claim 9, wherein the operating member has an inclination surface at a front side thereof and a guide member having another inclination surface in contact with the inclination surface of the operating member is mounted on a lower surface of the lifting portion.

12. The refrigerator of claim 1, wherein the lifting unit comprises:
  a supporting rod fixed to an inner wall of a lower side of the main body;
  a vibration preventing member inserted into an outer circumferential surface of the supporting rod to be lifted up and down; and
  a lifting portion fixed to an outer circumferential surface of the vibration preventing member and formed at both edges of the base plate.

13. The refrigerator of claim 12, wherein one end of the supporting rod is engaged with an inner wall of a lower side of the main body and a washer is mounted on the other end of the supporting rod, for preventing the vibration preventing member from being separated.

14. The refrigerator of claim 12, wherein an inner circumferential surface of the vibration preventing member is formed to have a larger inside diameter than an outside diameter of the supporting rod.

15. The refrigerator of claim 12, wherein the lifting portion is formed an upward direction at both edges of the base plate and has a fixing hole inserted to a groove formed at an outer circumferential surface of the vibration preventing member.

16. The refrigerator of claim 12, wherein the locking unit comprises:
  a handle installed a reception groove formed at a lower side of the base plate;
  a rod connected to the handle and rotatably inserted into a through hole formed at the main body; and
  a cam eccentrically formed at an end part of the rod and positioned at a lower surface of the base plate, for pushing up the base plate when the rod is rotated.

17. The refrigerator of claim 16, wherein the locking unit further comprises a spring connected between the handle and one side of the reception groove, for maintaining a position where the handle is operated by providing an elastic force to the handle.

* * * * *